United States Patent [19]

Nanassi

[11] Patent Number: 5,382,040

[45] Date of Patent: Jan. 17, 1995

[54] BICYCLE TRAINING AID

[76] Inventor: John Nanassi, 35 Jones Rd., Hackensack, N.J. 07631

[21] Appl. No.: 83,346

[22] Filed: Jun. 28, 1993

[51] Int. Cl.6 ............................................. B62H 7/00
[52] U.S. Cl. .................................... 280/293; 280/298; 280/301; 280/47.371
[58] Field of Search ................... 280/288.4, 290, 293, 280/298, 301, 47.34, 47.371, 47.11

[56] References Cited

U.S. PATENT DOCUMENTS

| 2,229,778 | 1/1941 | Taulbee. | |
|---|---|---|---|
| 2,672,351 | 3/1954 | Kane | 280/288.4 |
| 2,761,689 | 9/1956 | Becker | 280/290 |
| 2,816,775 | 2/1955 | Costello. | |
| 3,485,507 | 12/1969 | Christof | 280/293 |
| 3,650,544 | 3/1972 | Cassell | 280/293 |
| 3,940,166 | 2/1976 | Smithea. | |
| 4,917,398 | 4/1990 | de Miranda Pinto | 280/293 |
| 5,028,066 | 7/1991 | Garth | 280/293 X |
| 5,052,704 | 10/1991 | Nauman | 280/288.4 X |

FOREIGN PATENT DOCUMENTS

| 2512767 | 3/1983 | France | 280/293 |
|---|---|---|---|
| 2668744 | 5/1992 | France | 280/288.4 |
| 2903818 | 8/1980 | Germany | 280/293 |

Primary Examiner—Mitchell J. Hill
Assistant Examiner—Carla Mattix
Attorney, Agent, or Firm—Rosenman & Colin

[57] ABSTRACT

A bicycle training aid which may be used as an aid in teaching an individual to ride a bicycle is disclosed. The aid is strapped onto the back of a novice cyclist. An instructor who walks alongside the cyclist is able to hold onto a rearwardly extending handle of the aid to assist the rider in maintaining balance while cycling.

3 Claims, 3 Drawing Sheets

BICYCLE TRAINING AID

FIELD OF THE INVENTION

The present invention relates to a training aid which may to be used as an aid in teaching an individual to ride a bicycle.

BACKGROUND OF THE INVENTION

Bicycle riding has been an enjoyable recreational activity for individuals of all ages for many years. More recently, bicycle riding has gained popularity as an economical means of transportation which is also environmentally friendly. Additionally, more individuals are utilizing the aerobic benefits of bicycle riding to assist them in attaining a measure of physical fitness. Consequently, there is a need for an instructional device that will assist an individual in learning how to ride a bicycle.

SUMMARY OF THE INVENTION

The bicycle training aid of the present invention comprises a body member having a forward portion and a rearward portion; strap means secured to the body member for releasably securing the body member to an occupant of the bicycle; and an arm rearwardly extending from the rearward portion of the body member, the arm having a proximal and a distal end, means for attaching the distal end of the arm to the rearward portion of the body member, and means for quick release of the arm from the body member.

The bicycle training aid of the present invention is worn by a novice cyclist, usually a child. The aid allows an instructor to walk or run alongside the cyclist while holding onto the rearwardly extending arm of the training aid. The instructor is thereby able to help the cyclist maintain balance and develop a sense of confidence while the cyclist learns to ride a bicycle. The extending arm of the training aid may be released from the hand, leaving the body portion attached to the rider for a secure feeling. In another embodiment, the arm is provided with quick release means from the body portion.

DESCRIPTION OF PREFERRED EMBODIMENTS

Figure 1:
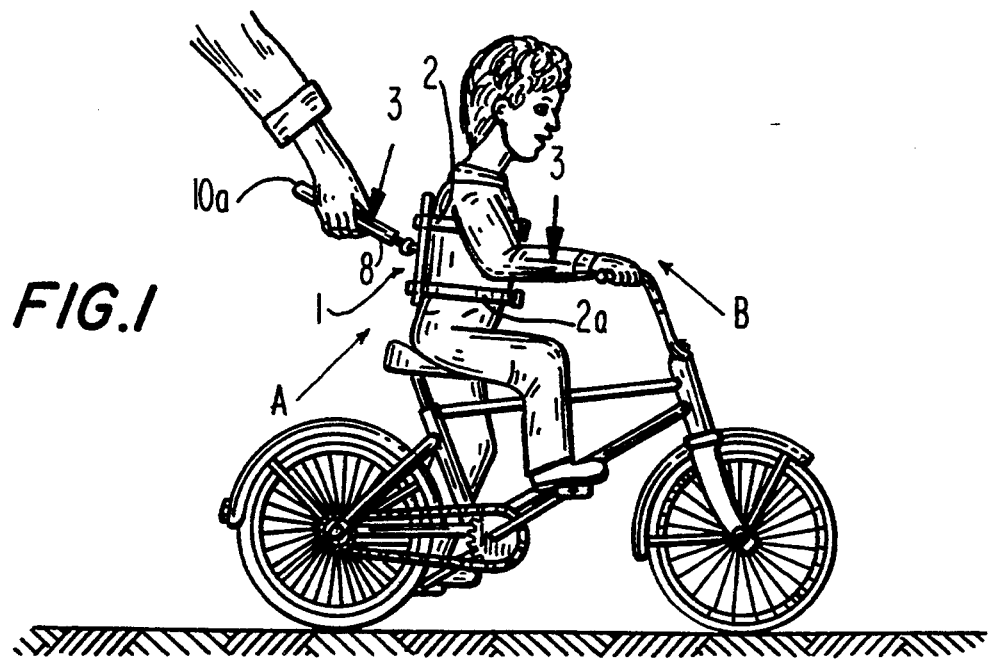
FIG. 1 is a side elevational view of the bicycle training aid of the invention being worn by a cyclist.
Figure 2:
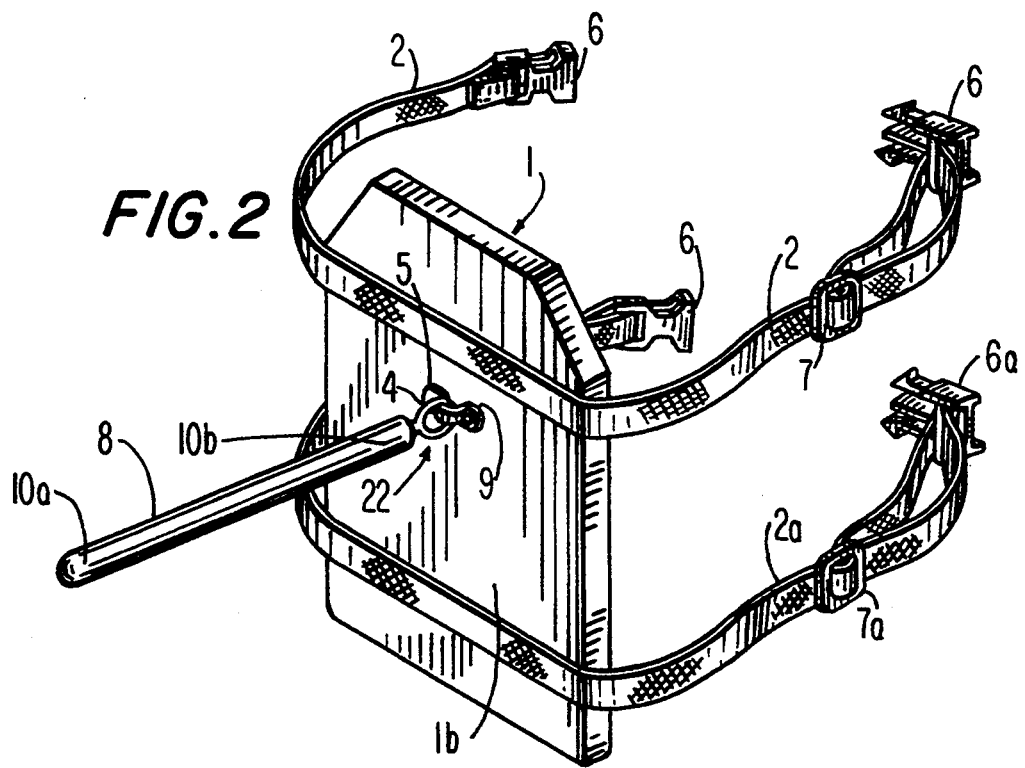
FIG. 2 is a view in perspective of the bicycle training aid.

Referring to the drawings, FIG. 1 shows the bicycle training aid A being worn by a child B. The training aid A has a body member 1 held against a cyclist's back by two strap means 2, 2a, each of which is releasably secured to the cyclist. An arm 8, having a proximal end 10a is attached to the body member 1 by attaching means 22 (FIG. 2). The proximal end 10a of arm 8 is held by an instructor who may walk or run alongside the cyclist.

Figure 3:
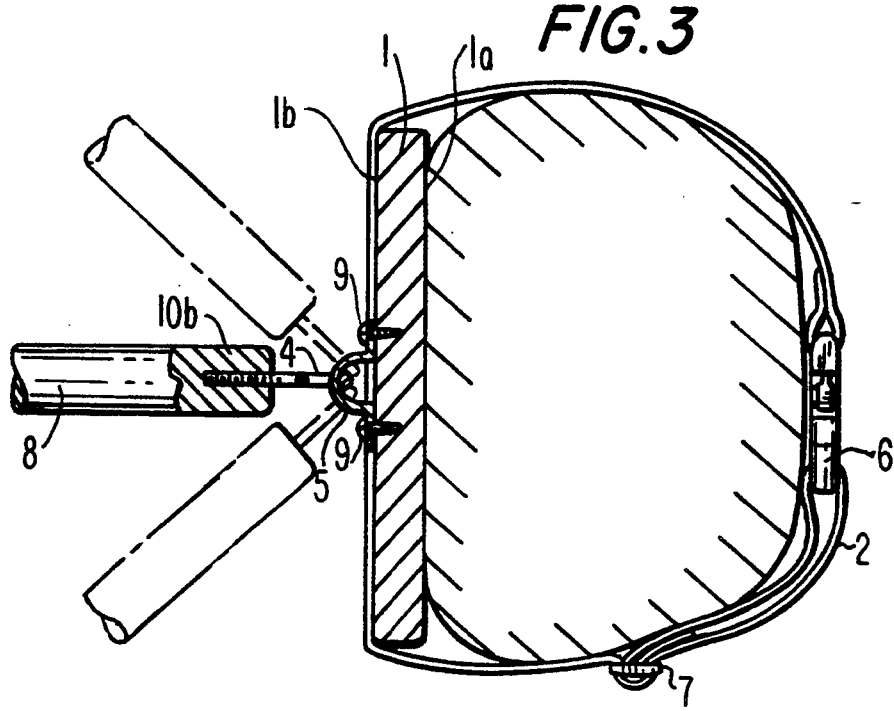
FIG. 3 is a view, in section, taken along lines 3—3 of FIG. 1.

Referring now to FIG. 2, it can be seen that each of the two strap means 2 and 2a terminates with a snap-type fastener 6 and 6a respectively, and has an adjustable buckle 7, 7a respectively. Each strap means 2, 2a is mounted to the rearward portion 1b of body member 1. The forward portion 1a (FIG. 3) of body member 1 contacts the back of the cyclist B. The distal end 10b of the arm 8 carries a first ring 4 which is engaged with loop 5, which is mounted onto the rearward portion 1b of body member 1 with screws 9 (FIGS. 2 and 3). When the proximal end 10a of arm 8 is grasped by an instructor, the arm 8 may be moved up and down and from side to side as shown in phantom lines in FIG. 3.

Figure 4:
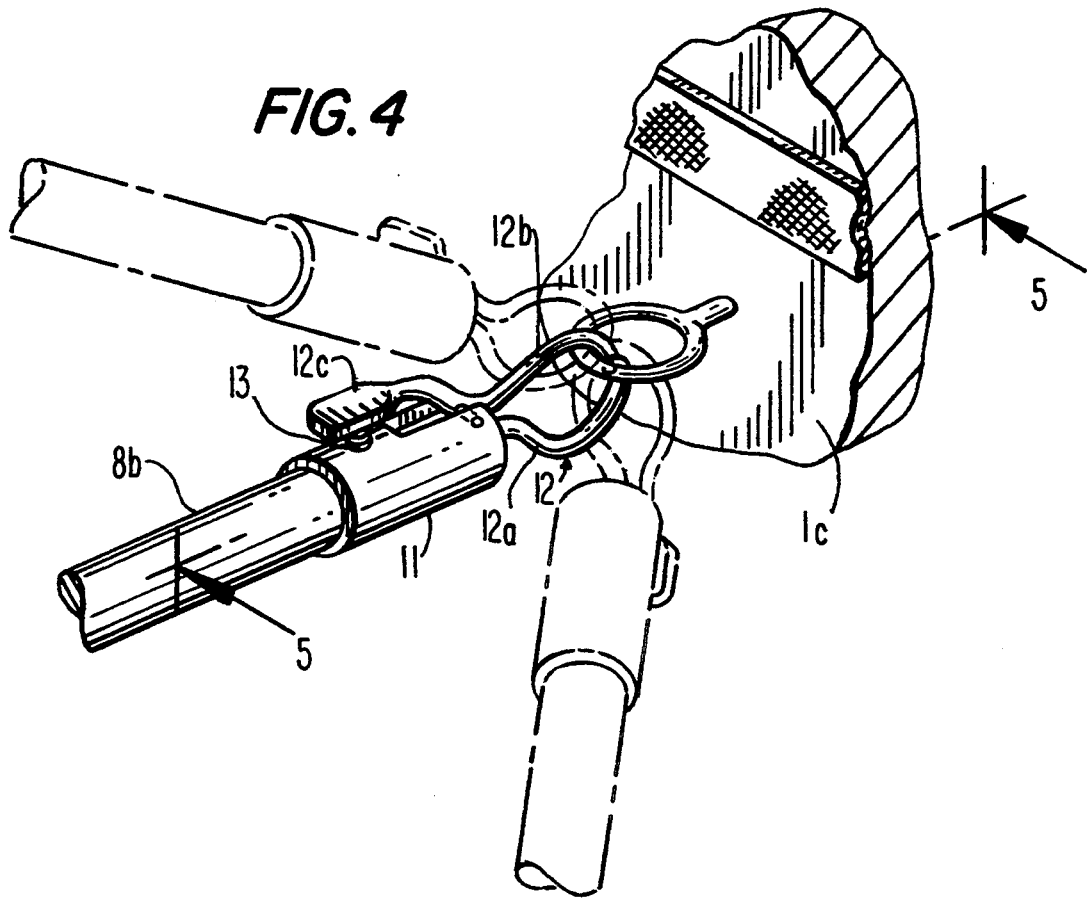
FIG. 4 is a detail view of another embodiment of the arm and attaching means of the bicycle training aid.
Figure 5:
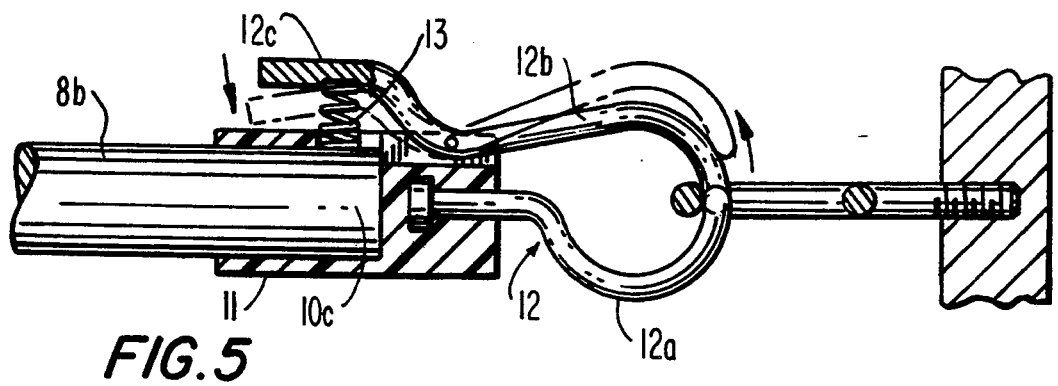
FIG. 5 is a view in section taken along lines 5—5 of FIG. 4.

Another embodiment of the invention is shown in FIGS. 4 and 5, where the distal end 10c (FIG. 5) of arm 8b is press fit into socket means 11 which has a ring-like member 12 with a fixed portion 12a and a movable portion 12b which is urged against portion 12a by spring 13 in the normally closed position. Finger pressure on finger pad 12c will cause member 12 to move to the open position shown by phantom lines in FIG. 5 and arm 8b may be readily removed from member 11c. As shown in phantom lines in FIG. 4, the arm 8b may be moved in all directions relative to body member 1.

Figure 6:
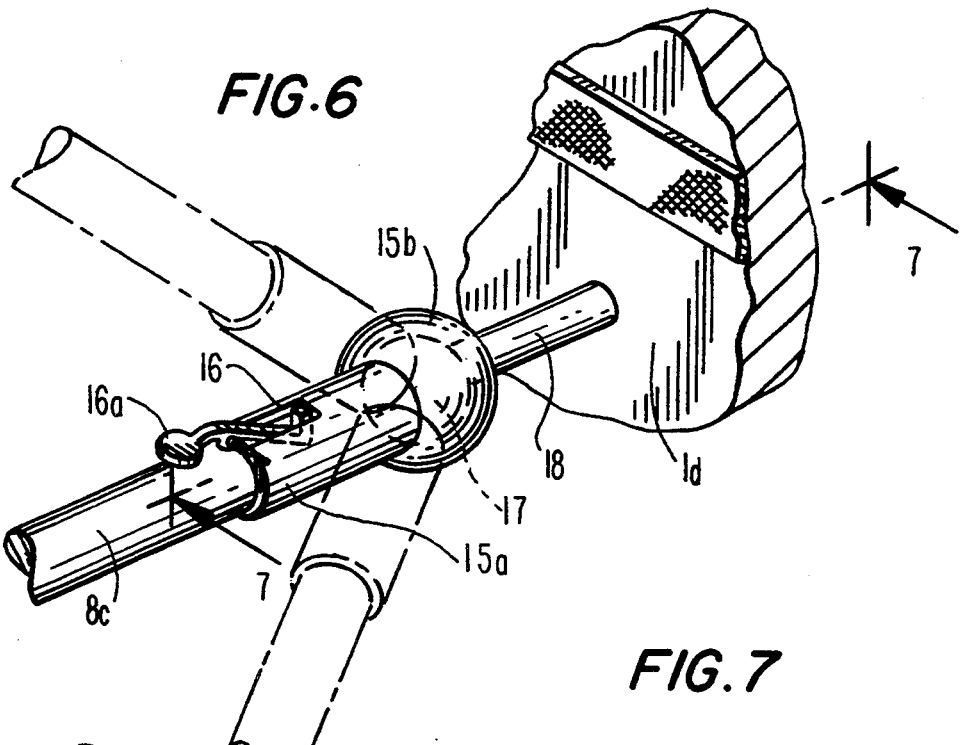
FIG. 6 is a view similar to that of FIG. 4 of another embodiment of the bicycle training aid.
Figure 7:
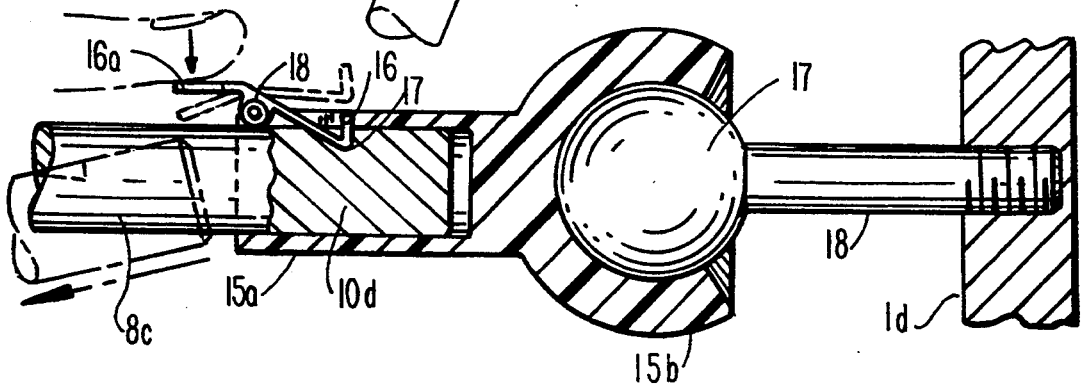
FIG. 7 is a view in section taken along lines 7—7 of FIG. 6.

In another embodiment of the invention as shown in FIGS. 6 and 7, the distal end 10c (FIG. 7) of the arm 8c is held in the sleeve 15a of the swivel socket 15b (FIG. 7) by the clip 16 engaging the groove 17 in distal end 10b of arm 8. Clip 16 is held in the engaged position by spring 18. Arm 8c may be released from body member 1d by application of pressure on finger pad 16a of clip 16 in the direction of arrow C as shown in phantom lines in FIG. 7. Ball 17 rotates within socket 15b and the shaft 18 of ball 17 has threads by which it may be screwed into the rearward portion of body member 1d. Arm 8c may be moved in all directions relative to body member 1d, as shown in phantom lines in FIG. 6.

Body member 1, 1c or 1d may be of wood or plastic or any other suitable material, and any suitable shape may be employed. As illustrated in FIG. 2, the two strap means 2, 2a may be attached to the rearward portion 1b of body member 1 in a transverse direction and parallel to each other by any suitable means, such as fasteners or suitable adhesives. Alternatively, the strap means may be made to pass through slits (not shown) made in the body member 1. The two strap means 2, 2a are preferably made of fabric although any suitable material may be used. The fastening means 6 and buckle 7 are conventional and can be any suitable means for releasably attaching the bicycle training aid to a cyclist. Arm 8 as shown in FIG. 2 is attached approximately midway between strap means 2, 2a in the center of the rearward portion 1b of body member 1. Arm 8 may be of wood or any other suitable material.

In operation, the bicycle training aid is used as follows. The forward portion of the body member 1 is placed against the back of a bicycle rider. The strap means 2, 2a are then fastened about the rider. An instructor may hold onto the arm 8 of the bicycle training aid 1 while the rider cycles. Thus, the novice is given a feeling of security and is assisted in maintaining balance while cycling. The instructor may release the arm 8 when the cyclist is sufficiently self-supporting or, in the case of the bicycle training aid shown in FIGS. 4–7, which feature a detachable arm, the arm may be quickly removed from the body member, thereby giving the rider complete independence, while having the secure feeling of the body member.

Although the training device has been described in connection with use on a bicycle, its application is not so limited, and, in fact, may be equally as applicable for use with all other types of cycles.

It is to be understood that the material described or shown in the accompanying drawings is to be interpreted as illustrative only and not as limiting the present invention.

I claim:

1. A cycle training aid which comprises:
   a contacting body member having a forward position and a rearward portion;
   strap means secured to said body contacting member for releasably securing said body contacting member to a cyclist; and
   an arm rearwardly extending from said rearward portion of said body contacting member, said arm having a proximal and a distal end, and means for attaching said distal end of said arm to said rearward portion of said body contacting member, whereby an instructor holding the proximal end assists the cyclist in maintaining balance while cycling, wherein said means for attaching said distal end comprises socket means attached to said distal end, said socket means having a seat, and a ball affixed to said rearward portion of said body contacting member, said ball being captured in said seat, said socket means being moveable in all directions relative to said body contacting member.

2. The training aid according to claim 1, wherein said arm is removable from said socket means.

3. A cycle training aid which comprises:
   a contacting body member having a forward position and a rearward portion;
   strap means secured to said body contacting member for releasably securing said body contacting member to a cyclist; and
   an arm rearwardly extending from said rearward portion of said body contacting member, said arm having a proximal and a distal end, and means for attaching said distal end of said arm to said rearward portion of said body contacting member, whereby an instructor holding the proximal end assists the cyclist in maintaining balance while cycling, wherein said attaching means releasably attaches said distal end of said arm to said body contacting member, wherein said attaching means includes a loop attached to said rearward portion, and a detachable fastener mounted on said distal end of said arm, said fastener having a fixed portion, a movable portion, means for urging said movable portion to a closed position relative to said fixed portion in which said fastener engages said loop, and a manually operated release means for urging said movable portion to an open position relative to said fixed portion in which said fastener is released from said loop.

* * * * *